United States Patent
Kweon et al.

(12) 
(10) Patent No.: US 6,589,695 B2
(45) Date of Patent: Jul. 8, 2003

(54) POSITIVE ACTIVE MATERIAL FOR RECHARGEABLE LITHIUM BATTERY AND METHOD OF PREPARING SAME

(75) Inventors: Ho-Jin Kweon, Cheonan (KR);
Sung-Kyun Jang, Suwon (KR);
Young-Uk Kwon, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 77 days.

(21) Appl. No.: 09/767,552

(22) Filed: Jan. 22, 2001

(65) Prior Publication Data

US 2001/0016284 A1 Aug. 23, 2001

(30) Foreign Application Priority Data

Jan. 26, 2000 (KR) .......................................... 2000-3548

(51) Int. Cl.$^7$ .............................. H01M 4/58; H01M 6/04
(52) U.S. Cl. ................. 429/231.1; 429/231.3; 429/206; 423/50; 423/140; 423/51; 423/594; 423/599; 423/464; 423/518; 423/511; 423/306; 423/299; 252/519.14; 252/519.15; 252/519.1

(58) Field of Search ............................ 429/231.1, 223, 429/224, 231.3, 206; 423/179.5, 50, 140, 594, 599, 464, 518, 511, 306, 299, 51; 252/519.14, 519.1, 519.15

(56) References Cited

U.S. PATENT DOCUMENTS

| 5,514,496 A | * | 5/1996 | Mishima et al. ............ 429/224 |
| 5,961,950 A | * | 10/1999 | Dahn et al. ............... 423/179.5 |
| 6,090,506 A | * | 7/2000 | Inoue et al. ................. 429/137 |

FOREIGN PATENT DOCUMENTS

| JP | 8-153513 | 6/1996 |
| JP | 10-316431 | * 12/1998 |

* cited by examiner

*Primary Examiner*—Laura Weiner
(74) *Attorney, Agent, or Firm*—Christie, Parker & Hale, LLP

(57) ABSTRACT

Disclosed is a method of preparing a positive active material for a rechargeable lithium battery. In this method, a lithium salt is reflux-reacted with a metal salt in a basic solution. The positive active material has a spherical or sperical-like form, diameter of 10 nm to 10 μm, and a surface area of 0.1 to 5 m$^2$/g.

9 Claims, 5 Drawing Sheets

POSITIVE ACTIVE MATERIAL FOR RECHARGEABLE LITHIUM BATTERY AND METHOD OF PREPARING SAME

CROSS-REFERENCE TO RELATED APPLICATION

This application claims priority of Korea patent Application No. 2000-3548, filed on Jan. 26, 2000.

BACKGROUND OF THE INVENTION (a) Field of the Invention

The present invention relates to a positive active material for a rechargeable lithium battery and a method of preparing the same, and more particularly, to a method of preparing a positive active material for a rechargeable lithium battery with a simple process.

(b) Description of the Related Art

Rechargeable lithium batteries use a material from or into which lithium ions are deintercalated or intercalated as positive and negative active materials. For an electrolyte, an organic solvent or polymer is used. Rechargeable lithium batteries produce electric energy from changes of chemical potentials of the active materials during the intercalation and deintercalation reactions of lithium ions.

For the negative active material in a rechargeable lithium battery, metallic lithium was used in the early days of development. Recently, however, carbon material which intercalate lithium ions reversibly is extensively instead of the metallic lithium due to problems of high reactivity toward electrolyte and dendrite formation of the metallic lithium. With the use of carbon-based active materials, the potential safety problems which are present in the batteries with the metallic lithium can be prevented while achieving relatively higher energy density as well as much improved cycle life.

For the positive active material in the rechargeable lithium battery, chalcogenide compounds into or from which lithium ions are reversibly deintercalated or intercalated are used. Typical examples include $LiCoO_2$, $LiMn_2O_4$, $LiNiO_2$, $LiNi_{1-x}Co_xO_2 (0<X<1)$ or $LiMnO_2$. Manganese-based materials such as $LiMn_2O_4$ or $LiMnO_2$ are relatively easy to prepare, are less expensive than the other materials, and have environmentally friendly characteristics. However, manganese-based materials have a low capacity. $LiNiO_2$ is inexpensive and has a high specific capacity, but is more difficult to prepare. $LiCoO_2$ is widely used in commercially available cells since it has good electrical conductivity and high battery voltage, but it is relatively expensive.

Generally, such composite metallic oxides are manufactured by the solid phase method. The solid phase method includes the steps of mixing solid raw material powders and sintering this mixture. For example, Japanese Patent publication No. Hei 8-153513 discloses a method in which $Ni(OH)_2$ is mixed with $Co(OH)_2$, or hydroxides including Ni or Co are mixed and the mixture is heat-treated, followed by the heat-treated mixture being ground and then sieved to produce $LiNi_{1-x}Co_xO_2$ (0<x<1). In another method, LiOH, Ni oxide and Co oxide react and the reactant is initially sintered at 400 to 580° C., and then the sintered reactant is sintered a second time at 600 to 780° C. to produce a crystalline active material.

However, such conventional methods have shortcomings, namely they require complex multiple steps and various equipment, and a long duration time. The conventional methods are performed at relatively high temperatures and produce products with a relatively large particle size, and it is difficult to control physical properties such as morphology of the active material particle and surface characteristics (surface area, pore size). Furthermore, $LiCoO_2$, which exhibits desirable electrical conductivity, good voltage and good electrochemical characteristics, is produced by heat-treating expensive oxides such as $Co_3O_4$ at 800 to 900° C., resulting in an expensive product.

The physical properties of the active material are critical for the electrochemical characteristics and should be controlled to optimize characteristics of the battery. In other words, the characteristics of the battery depend on the physical properties of the composite metal oxide. However, with the solid-phase process it is difficult to control the physical properties of the active material.

SUMMARY OF THE INVENTION

It is an object of the present invention to provide a method of preparing a positive active material for a rechargeable lithium battery using a simple process.

It is another object to provide a method of preparing a positive active material for a rechargeable lithium battery inexpensively.

It is still another object to provide a method of preparing a positive active material for a rechargeable lithium battery which exhibits good cycle life characteristics.

These and other objects may be achieved by a method of preparing a positive active material for a rechargeable lithium battery. In this method, a lithium salt is reflux-reacted with a metal salt in a basic solution.

The present invention further includes a positive active material for a rechargeable lithium battery having a spherical or spherical-like form with a particle diameter of 10 nm to 10 μm and a surface area of 0.1 to 5 m²/g. The positive active material is a compound represented by formulas 1 to 14.

| | |
|---|---|
| $Li_xMnA_2$ | (1) |
| $Li_xMnO_{2-z}A_z$ | (2) |
| $Li_xM_{1-y}M'_yA_2$ | (3) |
| $Li_xMn_{1-y}M'_yO_{2-z}A_z$ | (4) |
| $Li_xMn_2O_4$ | (5) |
| $Li_xMn_2O_{4-z}A_z$ | (6) |
| $Li_xMn_{2-y}M'_yA_4$ | (7) |
| $Li_xBA_2$ | (8) |
| $Li_xBO_{2-z}A_z$ | (9) |
| $Li_xB_{1-y}M''_yA_2$ | (10) |
| $Li_xNi_{1-y}Co_yA_z$ | (11) |
| $Li_xNi_{1-y}Co_yO_{2-z}A_z$ | (12) |
| $Li_xNi_{1-y-z}Co_yM''_zA_2$ | (13) |
| $Li_xNi_{1-y}Mn_yM'_zA_\alpha$ | (14) | where $0.5 \leq x \leq 1.5$, $0 \leq y \leq 0.1$, $0 \leq z \leq 0.5$; $0 \leq y' \leq 0.5$, $0 \leq z' \leq 0.1$, $0 < \alpha \leq 0.5$;

M' is at least one element selected from the group consisting of Al, Co, Cr, Fe, Mg, Sc, Y, La, Ce, Pr, Nd, Pm, Sm, Eu, Gd, Tb, Dy, Ho, Er, Tm, Yb and Lu;

M" is at least one element selected from the group consisting of Al, Cr, Mn, Fe, Mg, Sc, Y, La, Ce, Pr, Nd, Pm, Sm, Eu, Gd, Tb, Dy, Ho, Er, Tm, Yb and Lu;

A is selected from the group consisting of O, F, S and P; and

B is selected from the group consisting of Ni or Co.

BRIEF DESCRIPTION OF THE DRAWINGS

The file of this patent contains at least one drawings executed in color. Copies of this patent with color drawings will be provided by the Patent and trademark Office upon request and payment of the necessary fee.

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
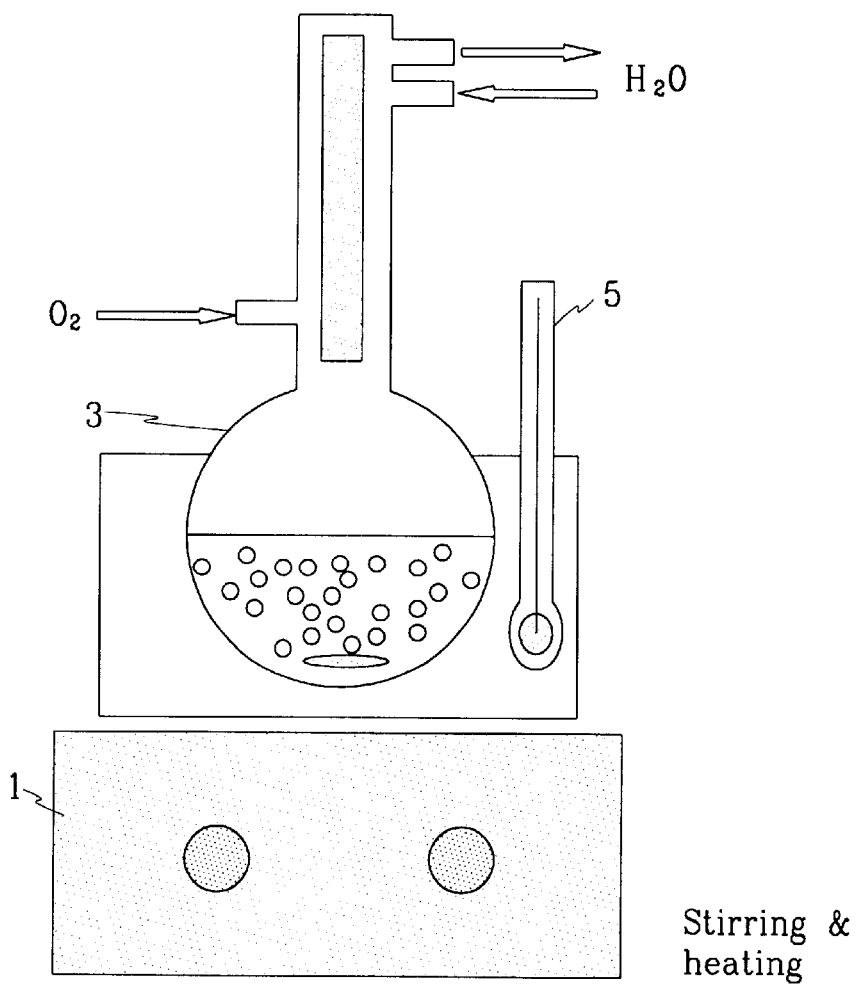
FIG. 1 is a cross sectional view showing a reflux apparatus used in the present invention.

Cobalt-based positive active materials for rechargeable lithium batteries exhibit improved electrical conductivity, good voltage and good charge-discharge characteristics. However, although they have such advantages, they are restricted in use due to their high preparation cost.

The present invention relates to a method of preparing a cobalt-based positive active material which can be economically produced with a simple process. In addition, the present invention applies to the cobalt-based positive active material as well as a manganese-based, nickel-based or nickel cobalt-based active material.

The preparation of the present invention will be illustrated in more detail.

A lithium salt is reflux-reacted with a metal salt in a basic solution and the reflux-reacted material is dried to produce a positive active material. The positive active material is selected from formulas 1 to 14.

| | |
|---|---|
| $Li_xMnA_2$ | (1) |
| $Li_xMnO_{2-z}A_z$ | (2) |
| $Li_xMn_{1-y}M'_yA_2$ | (3) |
| $Li_xMn_{1-y}M'_yO_{2-z}A_z$ | (4) |
| $Li_xMn_2O_4$ | (5) |
| $Li_xMn_2O_{4-z}A_z$ | (6) |
| $Li_xMn_{2-y}M'_yA_4$ | (7) |
| $Li_xBA_2$ | (8) |
| $Li_xBO_{2-z}A_z$ | (9) |
| $Li_xB_{1-y}M''_yA_2$ | (10) |
| $Li_xNi_{1-y}Co_yA_2$ | (11) |
| $Li_xNi_{1-y}Co_yO_{2-z}A_z$ | (12) |
| $Li_xNi_{1-y-z}Co_yM''_zA_2$ | (13) |
| $Li_xNi_{1-y}Mn_yM'_{z'}A_\alpha$ | (14) | where $0.5 \leq x \leq 1.5$, $0 \leq y \leq 0.1$, $0 \leq z \leq 0.5$; $0 \leq y' \leq 0.5$, $0 \leq z' \leq 0.1$, $0 < \alpha \leq 0.5$;

M' is at least one element selected from the group consisting of Al, Co, Cr, Fe, Mg, Sc, Y, La, Ce, Pr, Nd, Pm, Sm, Eu, Gd, Tb, Dy, Ho, Er, Tm, Yb and Lu;

M" is at least one element selected from the group consisting of Al, Cr, Mn, Fe, Mg, Sc, Y, La, Ce, Pr, Nd, Pm, Sm, Eu, Gd, Tb, Dy, Ho, Er, Tm, Yb and Lu;

A is selected from the group consisting of O, F, S and P; and

B is selected from the group consisting of Ni or Co.

The reflux-reaction process used in the present invention is generally used for synthesizing organic compounds. The reflux-reaction process includes steps of injecting reactants and solvent into a reaction bath, boiling volatile solvent by increasing the ambient temperature to evaporate the solvent, cooling the evaporated solvent and injecting part of the cooled solvent into the reacting bath. In the reflux-reaction process, product compounds are synthesized by repeated evaporation-condensation of the solvent in the reactant solutions so that seeds of the product compound are generated, and the seed is grown.

The reflux-reaction of the present invention is performed at 50 to 500° C., and preferably at 50 to 200° C. for 12 to 96 hours. If the reacting temperature is below 50° C., the reaction does not progress due to the low reaction energy. Also, it is difficult to perform the reaction at a temperature of above 500° C. because a reaction device which is able to work at this temperature is difficult to manufacture. In addition, if the reacting time is below 12 hours, the reaction does not complete and when the reacting time is above 96 hours, no additional advantage accrues.

The lithium salt may be lithium nitrate, lithium acetate or lithium hydroxide, and the metal salt may be manganese salts, cobalt salts, nickel salts or a mixture thereof. The manganese salt may be manganese acetate, or manganese dioxide, the cobalt salt may be cobalt hydroxide, cobalt nitrate or cobalt carbonate, and the nickel salts may be nickel hydroxide, nickel nitrate or nickel acetate. In addition, fluorine salts such as manganese fluoride or lithium fluoride, sulfide salts such as manganese sulfide or lithium sulfide, or a phosphorous salt such as $H_3PO_4$ may be further used. Although the above lithium salts, manganese salts, cobalt salts, nickel salts, fluorine salts, sulfide salts or phosphorous salts are the generally used ones in a rechargeable lithium battery, the present invention is not limited to them.

The basic solution may be an aqueous solution of KOH or NaOH, which is prepared by dissolving KOH or NaOH in water, or an organic solution of KOH or NaOH, which is prepared by dissolving KOH or NaOH in an organic solvent. The organic solvent may be alcohol such as methanol, ethanol, or propanol, ether or acetone, but is not limited to them. The pH of the basic solution is 7 to 14, and preferably 10 to 14. If the pH of the basic solution is below 7, the reaction does not progress.

A preparation of a positive active material of the present invention will be explained with reference to the accompanying drawings. As shown in FIG. 1, a lithium salt, a metal salt and a basic solution are added to a bath 1 such as volumetric flask of a reflux-device.

Thereafter, the mixture is heated to 50 to 500° C., preferably 50 to 200° C., with a hot plate 3. The temperature is checked with a thermometer 5. The mixture is reflux-reacted at that temperature for 12 to 96 hours while being stirred. At this time, in the mixture of the lithium salt, the metal salt and the basic solution, a seed is generated by the reflux-reaction, which results in a crystalline compound selected from formulas 1 to 14. After the completion of the reflux-reaction, the resulting solution is filtrated and dried at 80 to 150° C. for 10 to 15 hours to produce a compound powder selected from formulas 1 to 14.

The positive active material obtained from the above method has a spherical or spherical-like form, which results in an improved packing density of the positive electrode using the material. In addition, the positive active material has a diameter of 10 nm to 10 μm and 0.1 to 5 m²/g of surface area. If the diameter of the positive active material is below 10 nm, or if the surface area thereof is above 5 m²/g, the safety or thermal stability might become questionable due to high surface area. Whereas if the diameter is above 10 μm, or if the surface area is below 0.1 m²/g, the electrode kinetics might become too slow.

The present invention is further explained in more detail with reference to the following examples.

EXAMPLE 1

LiOH, Co(OH)$_2$ and an aqueous solution of KOH as starting materials were injected into a volumetric flask of a reflux-device, and a temperature of a hot plate of the reflux-device was increased to 180° C. At this time, the mixture was reflux-reacted at that temperature for 24 hours while being stirred. After the completion of the reflux-reaction, the resulting solution was filtered and the resulting powder was dried at 100° C. for 12 hours to produce a LiCoO$_2$ active material powder.

EXAMPLE 2

A LiCoO$_2$ active material powder was produced by the same procedure as in Example 1 except that the reflux-reaction was performed at 200° C.

EXAMPLE 3

A LiCoO$_2$ active material powder was produced by the same procedure as in Example 1 except that the reflux-reaction was performed at 130° C.

EXAMPLE 4

A LiCoO$_2$ active material powder was produced by the same procedure as in Example 1 except that the reflux-reaction was performed at 100° C.

COMPARATIVE EXAMPLE 1

LiCoO$_2$ powder (Nippon Chem C-5 (average diameter of 5 μm)) was used as a positive active material.

Figure 2A:
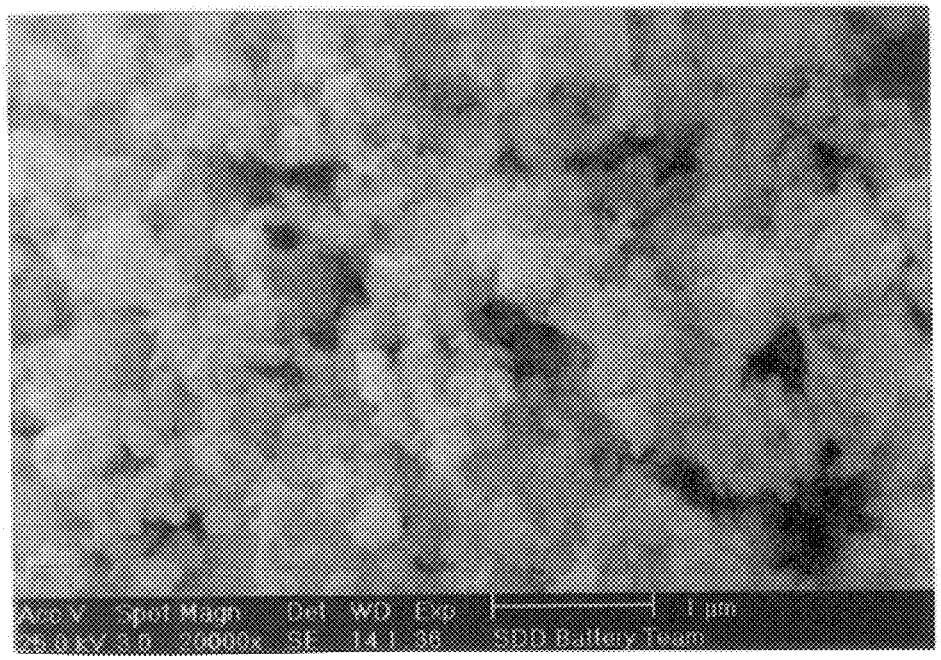
FIG. 2a is a SEM photograph of a positive active material according to Example 1 of the present invention.
Figure 2B:
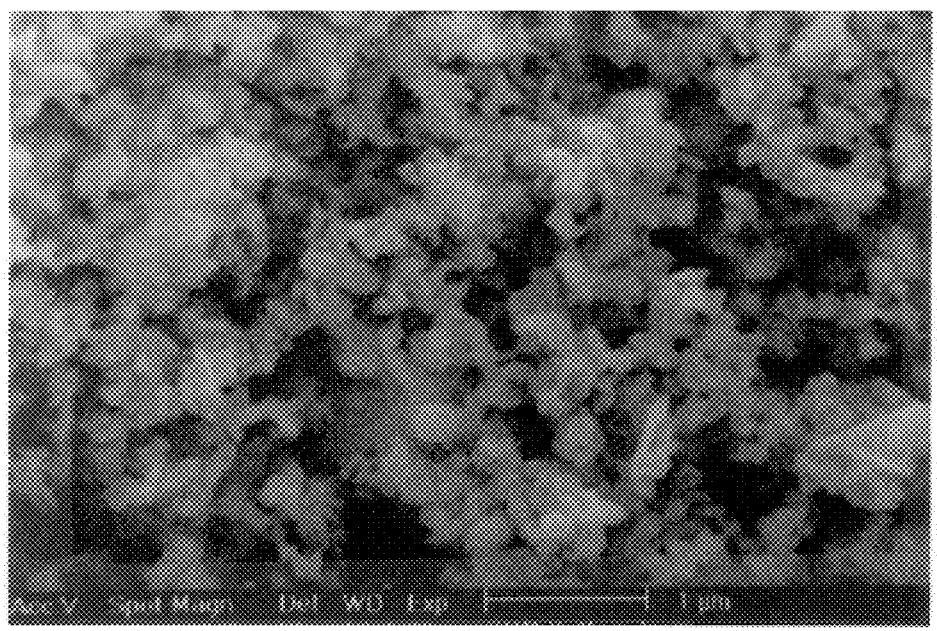
FIG. 2b is a SEM photograph of a positive active material according to Example 2 of the present invention.
Figure 2C:
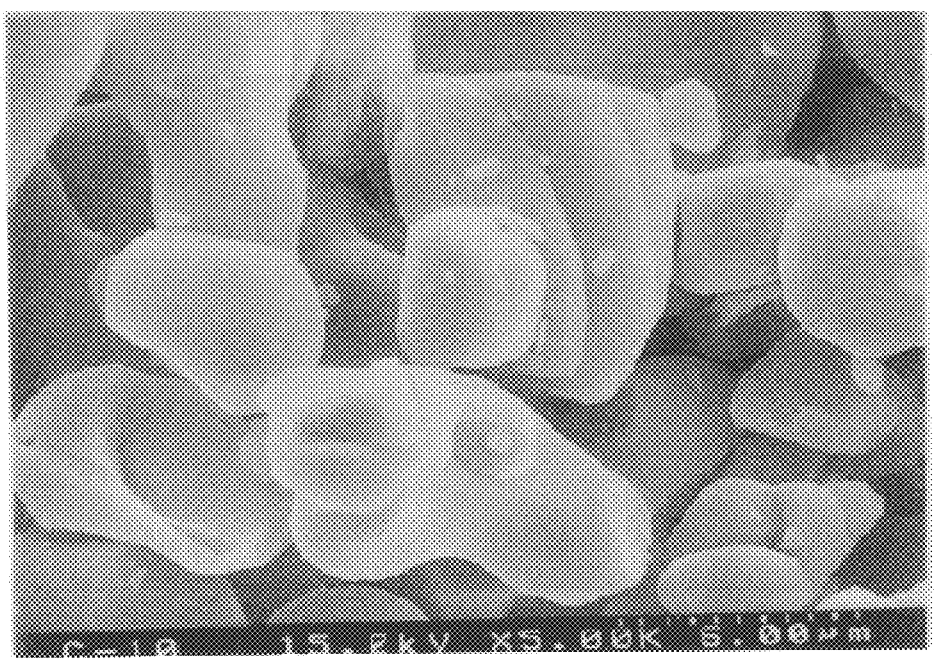
FIG. 2c is a SEM photograph of a positive active material according to Comparative Example 1.

SEM photographs of the positive active materials according to Examples 1 to 2, and Comparative Example 1 are shown in FIGS. 2a, 2b and 2c, respectively. As shown in FIGS. 2a, 2b, and 2c, the positive active materials according to Examples 1 to 2 are multiple-particles with a size of about 1 μm produced by agglomerating micro-particles with a size of 1 μm or less. In contrast, the positive active material of Comparative Example 1 is a single particle with an average size of 5 μm. Furthermore, the positive active materials of Examples 1 to 2 have a more spherical form than that of Comparative Example 1.

Figure 3:
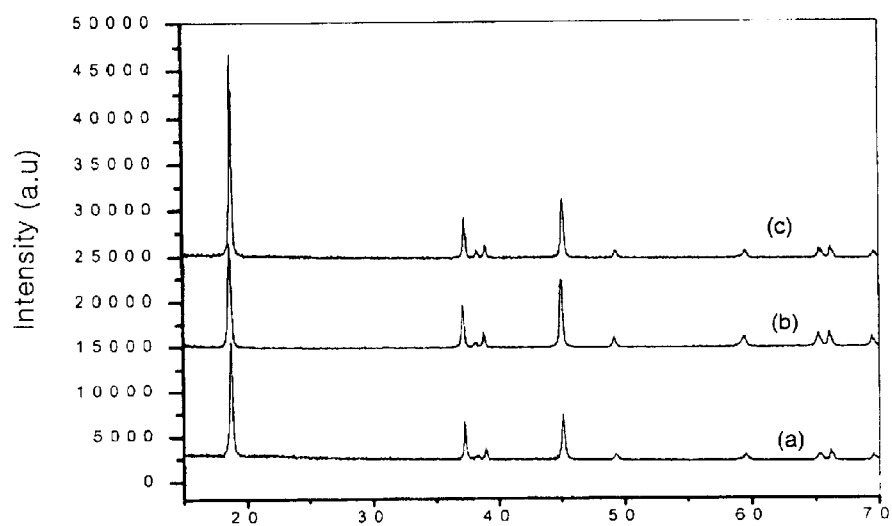
FIG. 3 is a graph showing an XRD pattern of a positive active material according to Examples 1 to 3 of the present invention.
Figure 4:
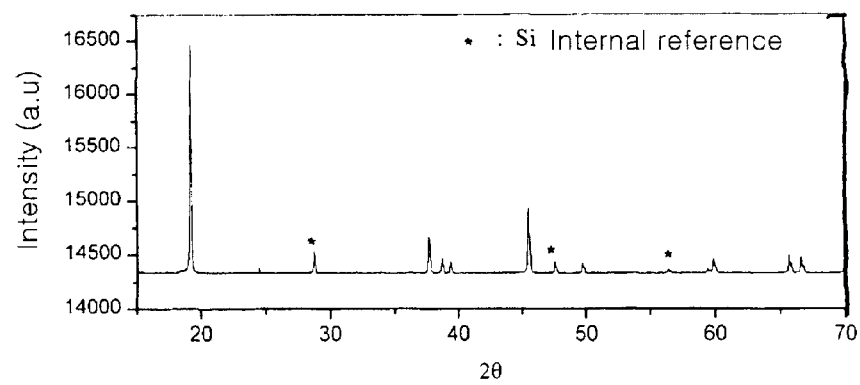
FIG. 4 is a graph showing an XRD pattern of a positive active material according to Comparative Example 1.

XRD patterns of the positive active materials according to Examples 1 to 3 are shown in FIG. 3. In FIG. 3, (a) denotes Example 1, (b) denotes Example 2, and (c) denotes Example 3. That of the positive active material according to Comparative Example 1 is shown in FIG. 4. XRD patterns shown in FIG. 3 are similar to that in FIG. 4, and the result is expected that the active materials according to Examples 1 to 3 have a structure of LiCoO$_2$.

Each of the active material of Example 2 and Comparative Example 1 were mixed in the weight ratio of 94:3:3 wt % with a conductive agent and a binder. The mixture was added to N-methyl pyrrolidone to prepare a positive active material slurry. The slurry was cast on an Al-foil to produce a positive electrode. The positive electrode was assembled with metallic lithium as a reference electrode to manufacture a coin-type lithium half-cell. For the electrolyte, 1M LiPF$_6$ in ethylene carbonate and dimethyl carbonate mixture (1:1 volume ratio) was used.

Figure 5:
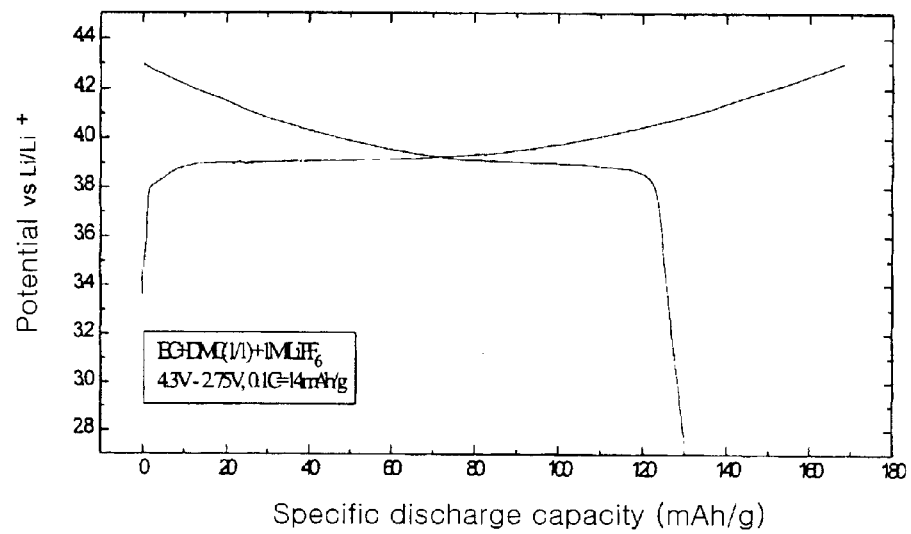
FIG. 5 is a graph illustrating charge and discharge characteristics of a positive active materials according to Example of the present invention.
Figure 6:
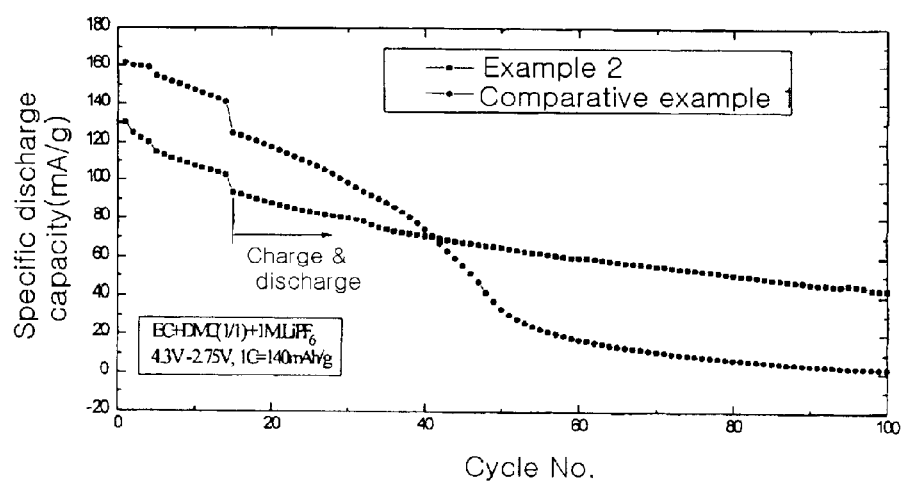
FIG. 6 is a graph illustrating cycle life characteristics of positive active materials according to Example and Comparative Example of the present invention.

The charge and discharge characteristics of Example 2 were measured and the result is presented in FIG. 5. In addition, the cycle life characteristics of the cells were measured and the results are presented in FIG. 6. For the charge-discharge cycles, test cells were cycled once at 0.1 C, three times at 0.2 C, 10 times at 0.5 C and then 86 times at 1 C, between 4.3 and 2.75 V. As shown in FIG. 5, the charge characteristics of the positive active material according to Example 2 were similar to those of Comparative Example 1, but the discharge voltages were slightly lower than Comparative Example 1. However, as shown in FIG. 6, the cell of Example 2 exhibited a capacity loss of about 50 mAh/g after 86 charge-discharge cycles at 1 C rate, but that of Comparative example 1 exhibited capacity loss of about 120 mAh/g. Accordingly, the cell of Example 2 exhibited better cycle life characteristics than those of Comparative Example 1.

It is therefore shown that the positive active material of the present invention exhibits good charge and discharge characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a positive active material for a rechargeable lithium battery comprising:
   introducing into a reaction vessel a lithium salt, a metal salt and a basic solution comprising a solvent and containing an alkali salt other than a lithium salt;
   heating the reaction vessel to evaporate at least a portion of the solvent;
   cooling the evaporated solvent; and
   injecting at least a part of the cooled solvent into the reaction vessel to produce the positive active material.

2. The method of claim 1 wherein the positive active material is selected from the group consisting of formulas 1 to 14:

| | |
|---|---|
| $Li_xMnA_2$ | (1) |
| $Li_xMnO_{2-z}A_z$ | (2) |
| $Li_xMn_{1-y}M'_yA_2$ | (3) |
| $Li_xMn_{1-y}M'_yO_{2-z}A_z$ | (4) |
| $Li_xMn_2O_4$ | (5) |
| $Li_xMn_2O_{4-z}A_z$ | (6) |
| $Li_xMn_{2-y}M'_yA_4$ | (7) |
| $Li_xBA_2$ | (8) |
| $Li_xBO_{2-z}A_z$ | (9) |
| $Li_xB_{1-y}M''_yA_2$ | (10) |
| $Li_xNi_{1-y}Co_yA_2$ | (11) |
| $Li_xNi_{1-y}Co_yO_{2-z}A_z$ | (12) |
| $Li_xNi_{1-y-z}Co_yM''_zA_2$ | (13) |
| $Li_xNi_{1-y'}Mn_yM'_{z'}A_\alpha$ | (14) | where $0.5 \leq x \leq 1.5$, $0 \leq y \leq 0.1$, $0 \leq z \leq 0.5$; $0 \leq y' \leq 0.5$, $0 \leq z' \leq 0.1$, $0 < \alpha \leq 0.5$;

M' is at least one element selected from the group consisting of Al, Co, Cr, Fe, Mg, Sc, Y, La, Ce, Pr, Nd, Pm, Sm, Eu, Gd, Tb, Dy, Ho, Er, Tm, Yb and Lu;

M" is at least one element selected from the group consisting of Al, Cr, Mn, Fe, Mg, Sc, Y, La, Ce, Pr, Nd, Pm, Sm, Eu, Gd, Tb, Dy, Ho, Er, Tm, Yb and Lu;

A is selected from the group consisting of O, F, S and P; and

B is selected from the group consisting of Ni or Co.

3. The method of claim 1 wherein the heating, cooling and injecting steps are performed at 50 to 500° C. for 12 to 96 hours.

4. The method of claim 1 wherein a pH of the basic solution is 10 to 14.

5. The method of claim 1 wherein the basic solution is an aqueous solution.

6. The method of claim 5 wherein the basic solution is a KOH solution or a NaOH solution.

7. A positive active material for a rechargeable lithium battery produced by the process of claim 1.

8. The positive active material for a rechargeable lithium battery according to claim 7 having a particle diameter of 10 nm to 10 μm and a surface area of 0.1 to 5 m²/g, the positive active material being selected from the group consisting of formulas 1 to 14.

| | |
|---|---|
| $Li_xMnA_2$ | (1) |
| $Li_xMnO_{2-z}A_z$ | (2) |
| $Li_xM_{1-y}M'_yA_2$ | (3) |
| $Li_xMn_{1-y}M'_yO_{2-z}A_z$ | (4) |
| $Li_xMn_2O_4$ | (5) |
| $Li_xMn_2O_{4-z}A_z$ | (6) |
| $Li_xMn_{2-y}M'_yA_4$ | (7) |
| $Li_xBA_2$ | (8) |
| $Li_xBO_{2-z}A_z$ | (9) |
| $Li_xB_{1-y}M''_yA_2$ | (10) |
| $Li_xNi_{1-y}Co_yA_2$ | (11) |
| $Li_xNi_{1-y}Co_yO_{2-z}A_z$ | (12) |
| $Li_xNi_{1-y-z}Co_yM''_zA_2$ | (13) |
| $Li_xNi_{1-y'}Mn_yM'_{z'}A_\alpha$ | (14) | where $0.5 \leq x \leq 1.5$, $0 \leq y \leq 0.1$, $0 \leq z \leq 0.5$; $0 \leq y' \leq 0.5$, $0 \leq z' \leq 0.1$, $0 < \alpha \leq 0.5$;

M' is at least one element selected from the group consisting of Al, Co, Cr, Fe, Mg, Sc, Y, La, Ce, Pr, Nd, Pm, Sm, Eu, Gd, Tb, Dy, Ho, Er, Tm, Yb and Lu;

M" is at least one element selected from the group consisting of Al, Cr, Mn. Fe, Mg, Sc, Y, La, Ce, Pr, Nd, Pm, Sm, Eu, Gd, Th, Dy, Ho, Er, Tm, Yb and Lu;

A is selected from the group consisting of O, F, S and P; and

B is selected from the group consisting of Ni or Co.

9. The method of claim 1, further comprising repeating the heating, cooling and injecting steps one or more times.

* * * * *